United States Patent [19]

Seto et al.

[11] 4,247,593
[45] Jan. 27, 1981

[54] MAGNETIC RECORDING MEDIUM AND METHOD OF PREPARING THE SAME

[75] Inventors: Junetsu Seto, Yokohama; Toru Nagai, Tokyo, both of Japan

[73] Assignee: Sony Corporation, Tokyo, Japan

[21] Appl. No.: 808,620

[22] Filed: Jun. 21, 1977

[30] Foreign Application Priority Data

Jun. 22, 1976 [JP] Japan .................................. 51-73424

[51] Int. Cl.² .......................... B32B 5/16; B32B 9/00; B32B 15/00
[52] U.S. Cl. .................................... 428/328; 427/127; 427/128; 428/900
[58] Field of Search ............................... 427/127–132, 427/48; 252/62.54; 428/900, 328

[56] References Cited

U.S. PATENT DOCUMENTS

| | | |
|---|---|---|
| 3,655,595 | 4/1972 | Higashi ............................ 427/128 X |
| 3,929,658 | 12/1975 | Beske ............................... 427/128 X |
| 3,996,407 | 12/1976 | Gross ............................... 427/128 X |

Primary Examiner—Bernard D. Pianalto
Attorney, Agent, or Firm—Hill, Van Santen, Steadman, Chiara & Simpson

[57] ABSTRACT

A magnetic recording medium is produced using a highly purified lecithin which is selectively adsorbed upon magnetic powder particles so as to coat substantially the entire surface of such particles with a monomolecular layer, thereby providing a magnetic record medium of improved magnetic properties.

8 Claims, 11 Drawing Figures

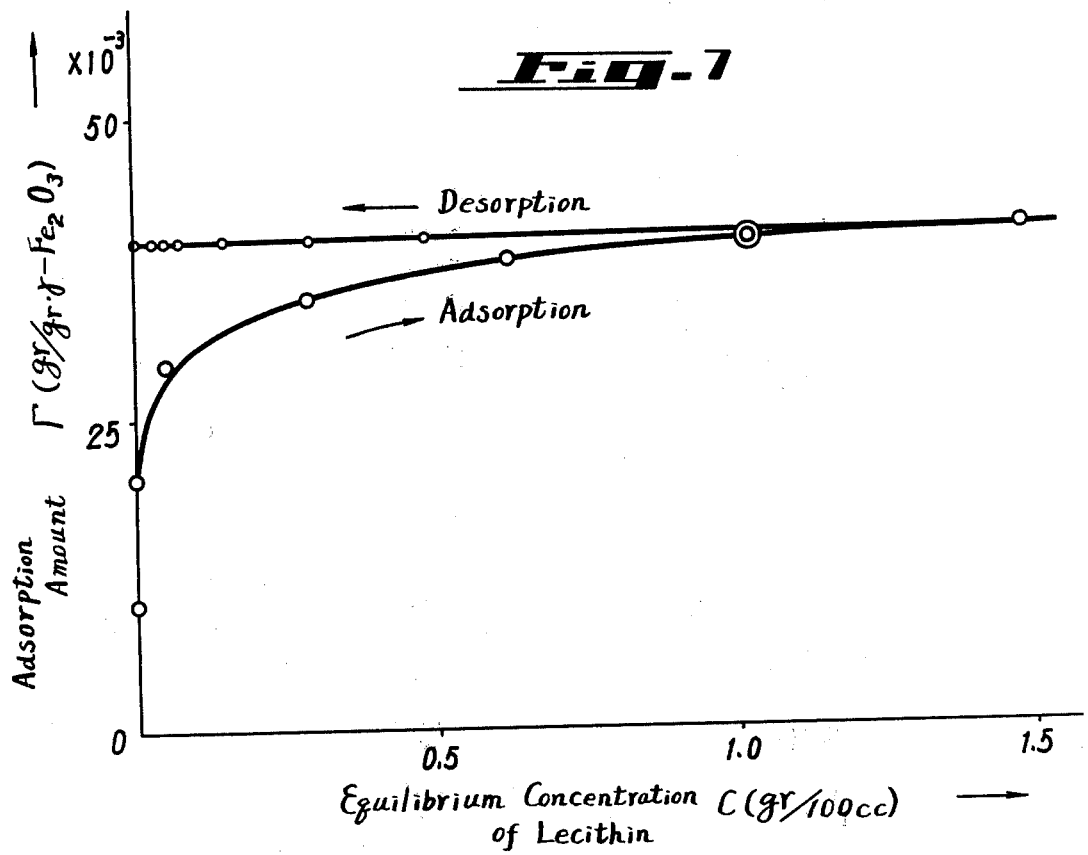
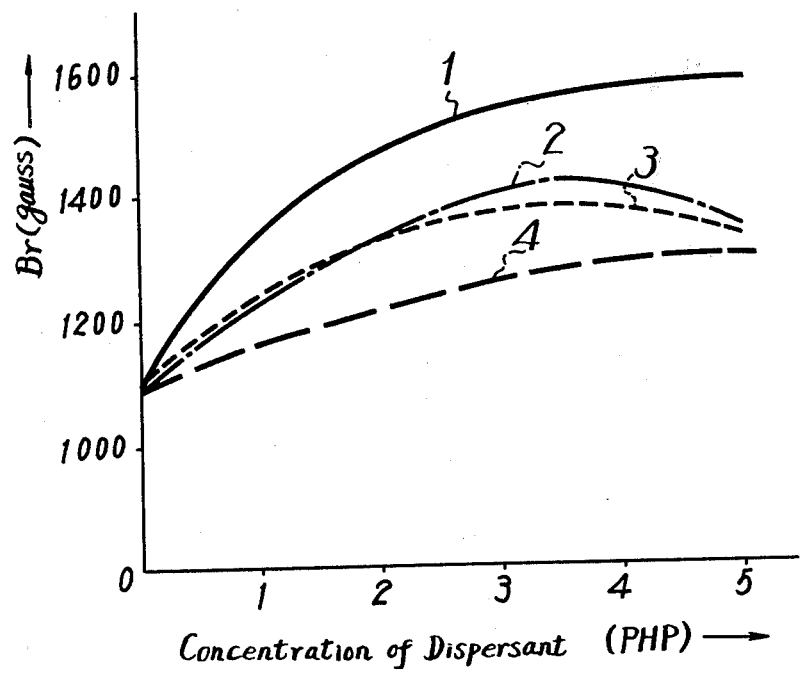

(Dispersant is used 5 PHP total)

(Dispersant is used 5 PHP total)

MAGNETIC RECORDING MEDIUM AND METHOD OF PREPARING THE SAME

BACKGROUND OF THE INVENTION

1. Field of the Invention

This invention relates to a magnetic recording medium and to a method for its preparation, and is particularly directed to an improved method for dispersing magnetic powder into a resinous binder to achieve improved residual magnetic flux density $B_r$, improved squareness ratio $R_s$, and a better packing density.

2. Description of the Prior Art

In the manufacture of magnetic recording media, magnetic powder is treated by means of various kinds of dispersants or surfactants in order to improve the dispersion of the magnetic powder in the magnetic coating material. Surfactants such as fatty acids, metallic salts of fatty acids (metallic soaps) or the like have been used. However, when these materials are used in a magnetic medium, their surface activity is not sufficient and therefore do not improve the dispersion greatly.

In other examples of the prior art, there has been proposed a method in which the magnetic powder is treated preliminarily by lecithin. In this proposal, however, ordinary lecithin as available on the market was used, this being a raw lecithin which includes a large quantity of impurities.

There has also been proposed a method by N. Kazino et al. in Japanese Laid Open Specification No. 309/1976, a method which uses a lecithin prepared in such a manner that ordinary lecithin is extracted with acetone to remove neutral fats or fatty acids. Even with the acetone extracted lecithin, however, the degree of dispersion of magnetic powder achieved is insufficient.

SUMMARY OF THE INVENTION

From our experimental work, we have ascertained that the typical raw lecithin on the market, and the acetone purified lecithin contain only about 10% or 20% pure lecithin at most, respectively. We have also determined that since these lecithins contain a large amount of impurities, they are difficult to apply over the entire surface of magnetic powder particles as a monomolecular layer. Furthermore, since the surface activity of such relatively impure materials is insufficient, the dispersion becomes insufficient. In other words, lecithin compositions containing such relatively small amounts of pure lecithin do not effectively cause adsorption of lecithin molecules to the surface of magnetic powder.

The present invention provides a magnetic recording medium including a non-magnetic base, a magnetic layer carried by the base and composed of magnetic powder particles dispersed in a resinous binder, the magnetic powder particles being covered on substantially their entire surfaces with a monomolecular layer composed substantially of lecithin. The improved lecithin composition which is selectively adsorbed on the surface of the particles contains at least 30% pure lecithin and is substantially devoid of fats, free fatty acids, cephalin and proteins.

The method of preparation basically consists of mixing the magnetic powder and an organic solvent with a purified lecithin composition having a purity of greater than 30% in an amount sufficient to cover substantially the entire surface of the magnetic powder particles with a monomolecular layer consisting essentially of lecithin, mixing the thus treated magnetic powder particles with a synthetic resin binder to form a magnetic paint, and applying the magnetic paint on a non-magnetic base to form a magnetic layer.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 7 is a graph plotting adsorption and desorption amounts of lecithin against equilibrium concentration;

FIG. 8 is a graph relating residual magnetic flux density with concentration of the dispersant;

DESCRIPTION OF THE PREFERRED EMBODIMENTS

Figure 1:
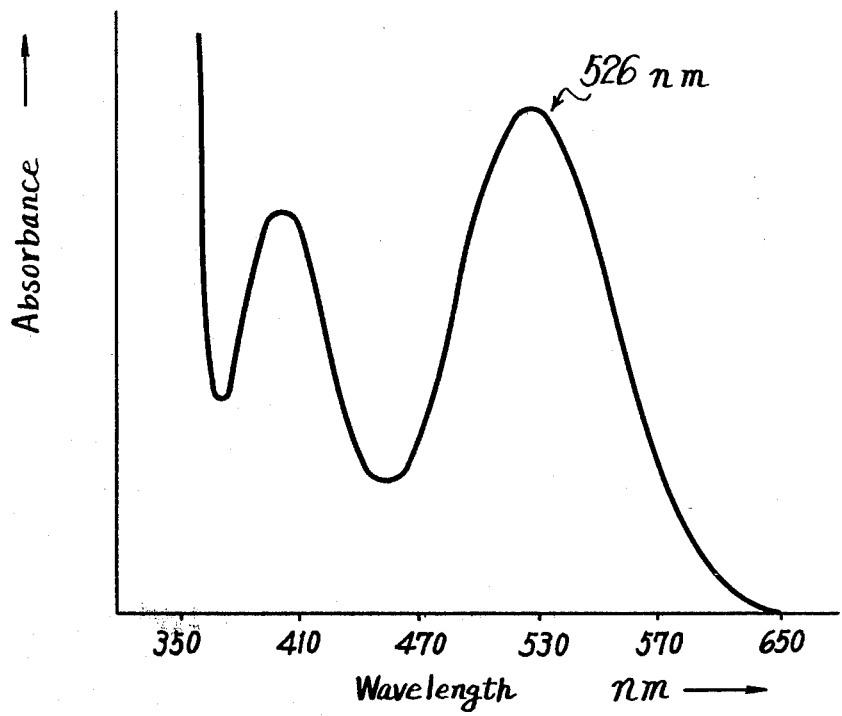
FIG. 1 is a graph showing the absorption spectrum of a choline-reinecke salt in acetone.

In the present invention, we use a lecithin of high purity which is at least 30%, and is preferably at least 50%. It has been found that using 4 parts per 100 parts magnetic powder (PHP) of a lecithin having a purity of 30%, more than 2.5 PHP of a lecithin of 50% purity, and more than 1.5 PHP in the case of a lecithin having a purity of 91%, a monomolecular layer, composed substantially entirely of lecithin can be applied on substantially the entire surface of the magnetic powder particles.

A lecithin having an extremely high purity of more than 30%, and preferably of 50% or more can be obtained by purifying a commercial lecithin available on the market, or by suitably processing a raw lecithin such as egg lecithin or soybean lecithin, or by using a synthetic lecithin. A suitable method of producing a lecithin of high purity by purifying raw lecithin was disclosed by M. C. Pangborn in Journal of Biological Chemistry, vol. 188, page 471 (1951). The following examples set forth various methods of producing high purity lecithin.

EXAMPLE 1

Egg lecithin (raw lecithin) marketed by Ajinomoto Company, Inc., in an amount of 350 grams was extracted with 3 liters of acetone to remove neutral fat and fatty acid material and leave a lecithin precipitate containing phospholipids and proteins which was thereupon dried. The yield of this precipitate, acetone purified lecithin was 200 grams. Next, this precipitate was extracted with 95% ethanol. The lecithin precipitate was dissolved in the ethanol and separated from impurities such as proteins, cephalin and the like. The amount of the precipitate was 100 grams. Then, a water solution of 50% cadmium chloride was added dropwise to the ethanol solution of lecithin to produce a white colloidal precipitate consisting of a complex salt of lecithin and cadmium chloride. This precipitate was washed with acetone, separated by filtration, and vacuum dried at a temperature below 40° C. Next, this complex salt was passed through a separatory funnel where it was dissolved in 100 cc of chloroform. The above solution was then mixed with 100 to 150 cc of 30% ethanol, shaken and permitted to stand. The cadmium chloride was dissolved into the ethanol and the lecithin remained in the chloroform. The ethanol layer is lower in specific gravity than the chloroform layer, so that after standing, the mixture separated into an ethanol upper layer and a chloroform lower layer. The chloroform layer was then removed from the lower end of the separatory funnel and the chloroform solution was again treated with ethanol, the process being repeated three times. Completion of the extraction was determined by the absence of a white precipitate of silver chloride when adding silver nitrate to a portion of the ethanol solution. Next, the chloroform solution of lecithin was dried by evaporation in a rotary evaporator. A transparent yellow lecithin of high purity was obtained in an amount of 15 grams. The purity of lecithin obtained by this purification was ascertained to be 91% according to an analysis method to be described later.

To permit easy understanding of the following lecithin purification method, the flow chart will be helpful.

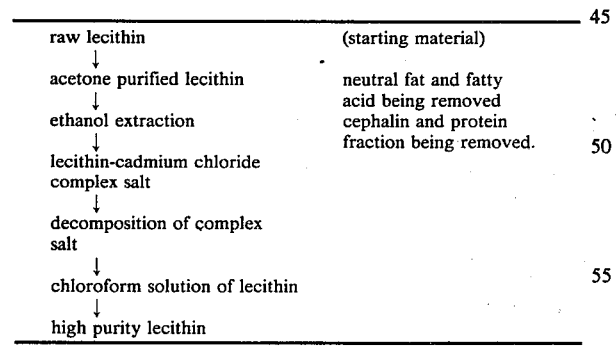

| raw lecithin | (starting material) |
|---|---|
| ↓ | |
| acetone purified lecithin | neutral fat and fatty acid being removed |
| ↓ | |
| ethanol extraction | cephalin and protein fraction being removed. |
| ↓ | |
| lecithin-cadmium chloride complex salt | |
| ↓ | |
| decomposition of complex salt | |
| ↓ | |
| chloroform solution of lecithin | |
| ↓ | |
| high purity lecithin | |

The high purity lecithin was mixed with magnetic powder in an organic solvent consisting of methyl ethyl ketone (MEK) or cyclohexanone, the mixing and dispersion thereof being carried out for 7 hours in a ball mill to produce a uniform suspension. The composition of this suspension (hereinafter referred to as composition "A") was as follows:

| gamma Fe$_2$O$_3$ (21.1 sq. m./g/) | 300 parts by weight |
|---|---|

-continued

| high purity lecithin | 4.5 parts by weight (1.5 PHP) |
|---|---|
| MEK | 300 parts by weight |

The above composition "A" was mixed with 50 parts by weight of "VYHH" resin sold by Union Carbide, which is a vinyl chloride-vinyl acetate copolymer and serves as a binding agent. It was also combined with a solution of 300 parts MEK by weight and milled in a ball mill for 20 hours to obtain a magnetic paint. This magnetic paint was applied to a non-magnetic base composed of polyethylene terephthalate film (Mylar), dried, subjected to calendering, and slitted to produce a magnetic recording tape.

EXAMPLE 2

A high purity lecithin was obtained by the process set forth in Example 1. Composition "A" was formed similarly as in Example 1, except that the amount of high purity lecithin was 6 PHP. An amount of 300 parts by weight of MEK was applied to the composition and mixed together for 1 hour in a ball mill, and thereafter was allowed to stand for 1 hour. Then, a supernatant solution of 300 parts by weight was removed to eliminate excess lecithin, i.e., the non-adsorbed lecithin. This composition was subjected to the treatments mentioned in Example 1 to produce a magnetic coating, and the coating was applied to a non-magnetic base to obtain a magnetic record medium.

The purity of the high purity lecithin described above was measured by colorimetric method described by M. H. Hack in the Journal of Biological Chemistry, vol. 169, page 137, 1947). In this method, a choline component available only in lecithin was separated and the thus separated amount is colorometrically determined to determine the amount of lecithin.

Structurally, lecithin has the structural formula (1) as set forth below which includes a choline chain having formula (2):

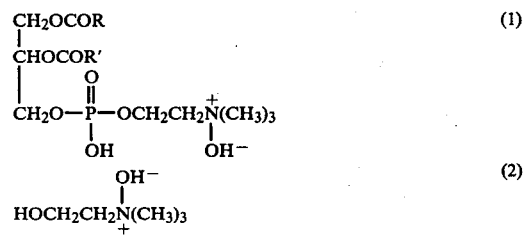

where ROCO and R'OCO are fatty acid residues from palmitic acid, stearic acid, oleic acid and the like.

The extraction of the choline component and its colorimetric determination were performed as follows. First, the lecithin was weighed and put in a 20 cc flask with a stopper into which a one normal (1 N) potassium hydroxide aqueous solution was applied in an amount of 5 cc in perform a hydrolysis reaction for 17 hours at 37° C. Thereafter, 4.5 N HCl was applied to dissolve the choline contained in the hydrolysis product and the dissolved choline was filtered to remove precipitates of impurities such as proteins which are insoluble in HCl aq. solution. The filter cake was treated with additional amounts of 1.5 N HCl for dissolution in an extraction so that the choline compound compound would not remain in the filter cake. A solution of the completely extracted choline compound was treated with ammonium reineckate $NH_4[Cr(NH_3)_2(SCN)_4]$. There was produced a precipitate of choline-reineckate which was removed and cleansed with ethanol. Before the quantitative analysis, the choline-reineckate precipitation was carried out at a temperature of 20° to 25° C. Since the precipitate has little solubility in ethanol, the ethanol was used under cool conditions to minimize the amount of dissolution which occurred. The thus obtained choline-reineckate was dissolved in 5 cc of acetone. This solution hereinafter referred to as solution "B" was pink in color and its absorbance Abs was determined by colorimetry. FIG. 1 shows the absorption characteristic of this reference solution. As shown in FIG. 1, the absorption spectrum has a peak at a wavelength of about 526 nm so that the absorbance of the acetone solution "B" was measured relative to a light having a wavelength of 526 nm.

Figure 2:
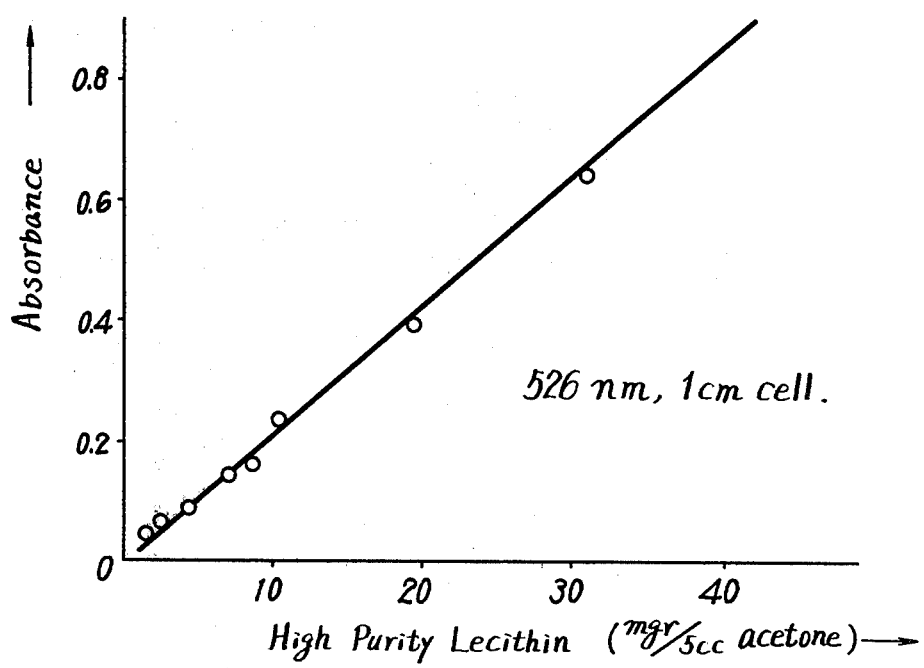
FIG. 2 is a graph showing the variation in absorbance with the concentration of high purity lecithin used in the present invention.

FIG. 2 shows the results obtained from measuring the absorbence of the high purity lecithin according to Example 1 by means of 1 cm cell. The absorbance Abs in this curve was measured according to the equation:

$$Abs = -\log T$$

where T is the light transmittance of the object to be measured.

Figure 3:
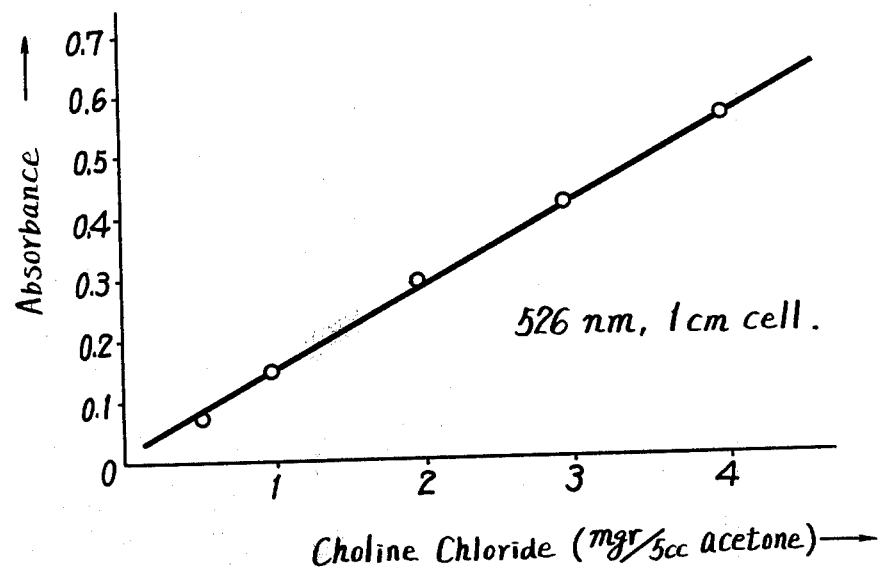
FIG. 3 is a graph showing the variation of absorbance with concentration of choline chloride in acetone solution.

The measured absorbance was compared with the reference absorbance spectrum to obtain the purity of the lecithin. The reference absorbance was obtained by reacting a commercial choline specimen (choline chloride) to produce a precipitate of choline chloride-reineckate by the same method used in the production solution "B" and the thus produced precipitate was dissolved in 5 cc of acetone and its absorbance was measured by the same method. The result is shown in FIG. 3. The abscissa represents the amount of choline chloride. The amount of choline chloride can be converted into the amount of lecithin by multiplying a suitable conversion factor. Since the molecular weight of choline chloride is 137.5 and that of lecithin is 793 and assuming that the fatty acid groups are both stearic acid groups, a conversion factor of 5.77 is obtained. If the relation between the amount of choline chloride and absorbance is converted to the relation between the amount of lecithin and absorbance, the weight of lecithin per unit of absorbance was 42.2 mg. The value of weight of lecithin per unit of absorbance according to Example 1 was 46.5 mg so that the purity of this lecithin corresponds to 91% of the choline specimen. Since the purity of the choline specimen can be regarded as about 100%, the purity of the high purity lecithin can be taken to be about 91%. In this connection, the purity of a raw egg lecithin on the market measured by the same method was 4.3%, and the purity of the lecithin purified by acetone was 7.1%. The purity of a raw soybean lecithin on the market was found to be 9.2% and that of its acetone purified product was 20%, which were both considerably lower than required. For this reason, the lecithin content of the compositions of the present invention have purities of at least 30%, and preferably 50% or more.

We will now describe the dispersion effect achieved in the present invention. First, we shall consider the adsorptive condition of lecithin on magnetic powder which is the basis of evaluating the dispersion effect. Magnetic powder consisting of gamma $Fe_2O_3$ in an amount of 50 grams and high purity lecithin of a predetermined amount were mixed together with MEK in an amount of 100 cc in a ball mill for 7 hours to produce a uniform suspension. After the lecithin had been adsorbed on the magnetic powder, the suspension was separated into solid and liquid phases using a centrifugal separator, and the supernatant solution was removed in a predetermined amount. The solvent of this removed portion was vaporized and the amount of lecithin was determined by the above-described colorimetric method. Since this amount of lecithin gives the equilibrium concentration C of adsorption, the amount of adsorption, $\Gamma$, to magnetic powder can be obtained from the original concentration, $C_o$, the volume of lecithin solution, V, and the powder weight, w, by means of the following equation:

$$\Gamma = V(C_o - C)/w$$

The measured results of the amount of adsorption at various concentrations of high purity lecithin (91% purity) are given in the following table.

TABLE 1

| Lecithin (PHP) | $C_o$(Orig. concentration) (g/100 cc) | C(Equi. concentration) (g/100 cc) | $\Gamma$(Adsorption) (g/g $\Gamma$ $Fe_2O_3$) | C/$\Gamma$ |
|---|---|---|---|---|
| 0.5 | 0.25 | 0 | 0.0050 | 0 |
| 1 | 0.50 | 0 | 0.0100 | 0 |
| 1 | 0.50 | 0 | 0.0100 | 0 |
| 2 | 1.00 | 0 | 0.0200 | 0 |
| 2 | 1.00 | 0 | 0.0200 | 0 |
| 3 | 1.50 | 0.0420 | 0.0292 | 1.44 |
| 3 | 1.51 | 0.0512 | 0.0292 | 1.75 |
| 4 | 2.00 | 0.285 | 0.343 | 8.31 |
| 5 | 2.50 | 0.620 | 0.0376 | 16.5 |
| 6 | 3.00 | 1.020 | 0.0396 | 25.8 |
| 7 | 3.50 | 1.472 | 0.0406 | 36.3 |

From the foregoing table, with a high purity of lecithin of 91% purity, when the original concentration $C_o$ is in the range of 0.25 to 1.0 g/100 cc, or the amount of lecithin added to the magnetic powder is 2 PHP or less, the equilibrium concentration C is zero, i.e., the added lecithin is all adsorbed to the magnetic powder and no lecithin remains in the solvent. Therefore, it is concluded that the lecithin molecules have strong surface activity and are irreversibly adsorbed.

Figure 4:
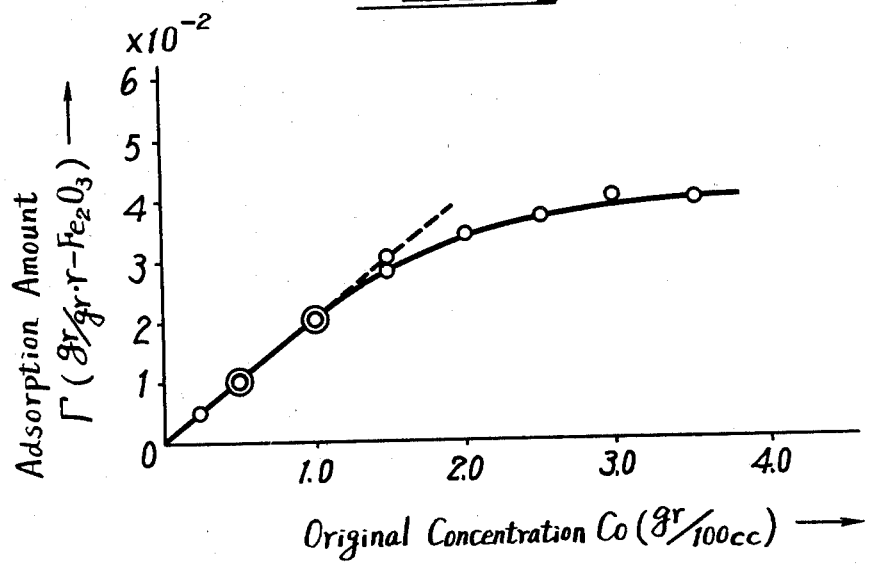
FIG. 4 is a graph showing the amount of adsorption of lecithin on gamma ferric oxide as a function of the original concentration.

FIG. 4 shows the relation between the amount of adsorption and the original concentration, $C_o$. From this figure, it will be seen that there is a linear relationship and an irreversible adsorption is achieved in the range where the original concentration $C_o$ is low. It also should be noted that if the concentration is increased, a saturated adsorption occurs.

The monomolecular adsorption step can be expressed by the Langmuir equation as follows:

$$\Gamma = \Gamma_s KC/(1 + KC)$$

or $$C/\Gamma = 1/\Gamma_s K + C/\Gamma_s$$

where $\Gamma_s$ is the amount of saturated adsorption and
K is a constant determined by the system. (4)

Figure 5:
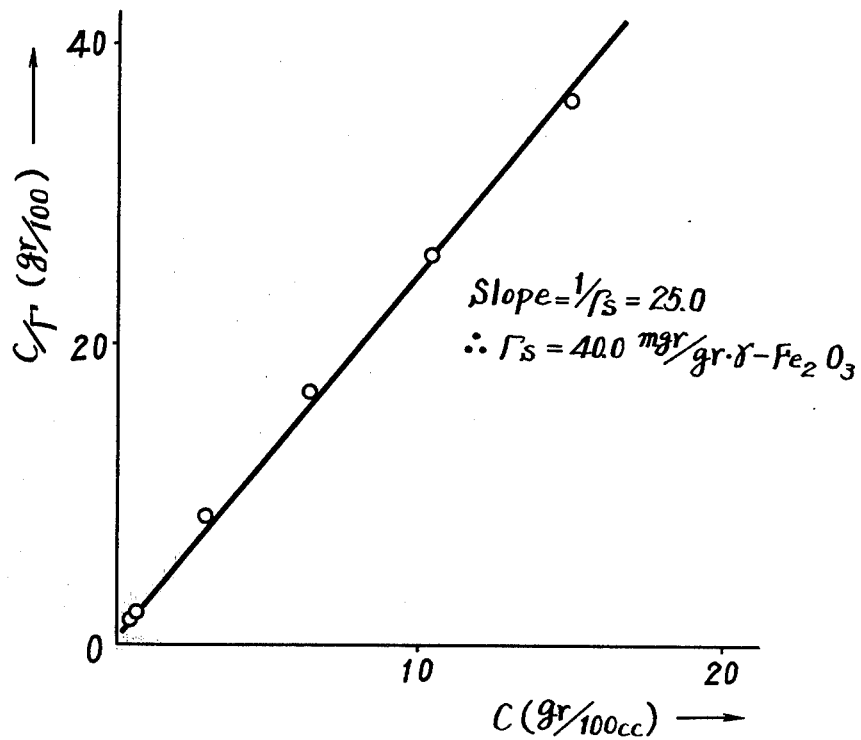
FIG. 5 is a graph showing the relationship between equilibrium concentration and ratio of equilibrium concentration to adsorption of lecithin on gamma ferric oxide.

From the above equation it will be seen that during the process of monomolecular adsorption to the solid surface, the relationship concentration to adsorption becomes linear and the reciprocal of the gradient is the amount of saturated adsorption. Applying the equations to adsorption data of the above-described high purity lecithin-gamma ferric oxide system of this invention, the adsorptive characteristics of the high purity lecithin were determined. FIG. 5 shows the relationship and the applicability of the Langmuir formula. As apparent from FIG. 5, a satisfactory linearity is obtained and so a monomolecular adsorption is produced in the concentration range shown in FIG. 5.

Figure 6:
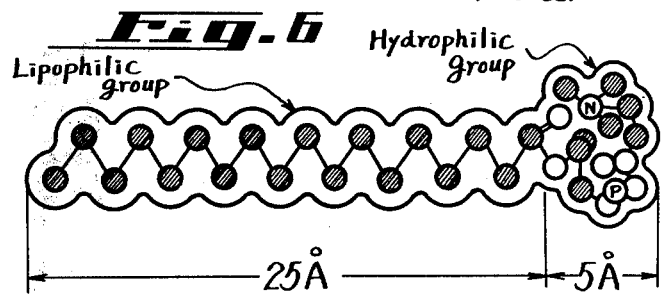
FIG. 6 is a diagrammatic illustration of the lecithin molecule.

On the other hand, it is well known that the lecithin molecule can form an oriented monomolecular layer of BLM layer (black lipid membrane or bilayer lipid member which is composed of two oriented monomolecular layers). It is also known that the lecithin molecule is composed of a hydrophilic group having a dimension of 5 Angstroms and a lipophilic group of 25 Angstroms, as shown in FIG. 6. In the drawing of FIG. 6, one of the lipophilic hydrocarbon chains is omitted because it is not visible from that position. Accordingly, on the surface of a solid such as gamma ferric oxide, the hydrophilic group is oriented toward the solid surface and the lipophilic group is oriented toward the organic solvent. When the adsorption is carried out in such a manner, the area of solid surface covered by one molecule, or occupied cross sectional area $S_o$ is in the range from 45 to 110 square Angstroms. In other words, the monomolecular layer of a lecithin molecule is quite compressible and can have a relatively wide range of adsorption density from a sparse condition to a dense condition. The adsorption condition and the condition of monomolecular layers formed on the surfaces of gamma ferric oxide particles were investigated according to the amount of saturated monomolecular adsorption obtained from the measured results of FIG. 5. As will be apparent from FIG. 5, the gradient or slope of the line is 25.0 and the saturated adsorption is 40 mg per gram of gamma ferric oxide. The molecular weight of lecithin is 793 and the specific surface area S of gamma ferric oxide powder used was 21.1 m²/g. Therefore, the occupied cross sectional area $S_o$ of the lecithin-gamma ferric oxide system is calculated as follows:

$$S_o = S/(\frac{\Gamma s}{Mw} N_A)$$
$$= 21.1 \times 10^4 / \frac{400 \times 10^{-3}}{793} \times 6.03 \times 10^{23})$$
$$= 69.4 \times 10^{-16} cm^2$$

where $N_A$ is Avogadro's number.

The value of the occupied cross sectional area is quite small within the above-mentioned wide range of occupied cross sectional area so that a relatively dense monomolecular layer is formed on the surface of the magnetic particles. According to Table 1, in order to adsorb lecithin onto the surface of gamma ferric oxide particles with the amount of adsorption so as to obtain the ideal effect of surface activity, the amount of lecithin should be 5 PHP or more and the original concentration $C_o$ should be 2.5 g/100 cc or more, corresponding to a value close to the amount of saturated adsorption.

The amount of adsorption of acetone purified lecithin (5 PHP) to gamma ferric oxide was measured with the result that equilibrium concentration after the adsorbing process was zero and no lecithin was detected in the solution. This means that all the lecithin was adsorbed to the magnetic powder with the result that its amount of adsorption was calculated to be 3.55 mg/g $Fe_2O_3$ which is less than 10% of the value shown in Table 1. The occupied cross sectional area $S_o$ of adsorbed molecules to magnetic powder may be considered the same as that of pure lecithin so that the actual surface coverage of magnetic powder by lecithin molecules is also less than 10%. In the case of using a raw egg lecithin on the market which has previously been used as a dispersant, the surface coverage of pure lecithin was only about 5% of that obtained when the high purity (91%) lecithin of the present invention was used. As a result, the excellent surface activity effect inherent in lecithin was not observed.

As noted previously, it is advisable to limit the amount of lecithin in the formulation so that it does not exceed the amount of saturated adsorption. Otherwise the magnetic characteristic can be adversely affected by excess lecithin which changes the particle surface hydrophilic to cause flocculation.

The existence of irreversible adsorption was ascertained in the following manner. First, 100 cc of MEK solution containing 3 g high purity (91%) of lecithin which substantially corresponds to the amount of its saturated adsorption in FIG. 4 was mixed with 50 g magnetic powder ($Fe_2O_3$) in a ball mill for 7 hours and the actual lecithin concentration of this solution was colorimetrically determined by the aforementioned method. Next, the solution was diluted by MEK and put in a slowly rotating ball for a 2 hour mixing. After the equilibrium condition was reached, the concentration of the supernatant solution was measured. By repeating the above process until the concentration was about 1/100 of the original concentration when the lecithin concentration at the solution side was regarded substantially as zero, the desorption behavior of the lecithin was measured. The solution to be diluted was partially removed in advance by almost the same amount as that supplied in diluent in each diluting operation so that during each slow agitation operation, the ratio to solution to solid was kept substantially constant, and the mixing condition was not affected by dilution. The measured results of desorption of lecithin in the lecithin-gamma ferric oxide system are shown in the following table.

TABLE 2

| Sample No. | Equi. concentration C(g/100cc) | Removed Solvent $V_1$(cc) | Added Solvent $V_2$(cc) | Solvent $V_o$(cc) | Lecithin in $V_o$ (g) | Lecithin in $V_1$ (g) | Lecithin in Total Solvent (g)$_R$ | Adsorption $\Gamma(\times 10^{-3})$ |
|---|---|---|---|---|---|---|---|---|
| 101 | 1.020 | 0 | 0 | 100 | 1.020 | 0 | 1.020 | 39.6 |
| 102 | 0.484 | 5 | 100 | 195 | 0.939 | 0.051 | 0.990 | 40.2 |
| 103 | 0.285 | 70 | 100 | 225 | 0.641 | 0.339 | 1.031 | 39.4 |
| 104 | 0.144 | 115 | 100 | 210 | 0.302 | 0.328 | 1.020 | 39.6 |
| 105 | 0.0695 | 100 | 100 | 210 | 0.146 | 0.144 | 1.008 | 39.8 |
| 106 | 0.0425 | 100 | 100 | 210 | 0.0893 | 0.0695 | 1.021 | 39.5 |
| 107 | 0.0230 | 100 | 100 | 210 | 0.0483 | 0.0425 | 1.022 | 39.6 |

TABLE 2-continued

| Sample No. | Equi. concentration C(g/100cc) | Removed Solvent $V_1$(cc) | Added Solvent $V_2$(cc) | Solvent $V_o$(cc) | Lecithin in $V_o$ (g) | Lecithin in $V_1$ (g) | Lecithin in Total Solvent (g)R | Adsorption $\Gamma(\times 10^{-3})$ |
|---|---|---|---|---|---|---|---|---|
| 108 | 0.0112 | 100 | 170 | 270 | 0.0302 | 0.0230 | 1.027 | 39.5 | where $\Gamma = \frac{3.00 - R}{50}$ (g/g $Fe_2O_3$)

In the above table, the equilibrium concentration C corresponds to that of a mixture having an amount of solvent $V_0$, and the solvent amount $V_0$ corresponds to an amount of mixture which is added to an amount of solvent $V_2$ after solvent $V_1$ is removed from the mixture prior to dilution. The amount of lecithin R in the total solvent indicates the sum of the lecithin amounts in the removed solvent and the lecithin amount in the added solvent.

FIG. 7 illustrates the above results, indicating both the adsorption and desorption steps. As apparently shown by FIG. 7, the amount of adsorption at the desorption step was maintained at substantially 100% of the level of saturated adsorption, or about 39.6 mg/g gamma ferric oxide for all these cleaning operations. Therefore, even with the removal of excess lecithin contained in the solvent, the surface coverage of the magnetic powder is substantially 100%.

The following table, Table 3, shows the measured results obtained with regard to magnetic recording characteristics of various samples. Samples—Nos. 1 to 8 were prepared by adding the amount of high purity lecithin indicated into the solution "A" with no calendering process being applied. Samples 9 to 12 used acetone purified lecithin, and Samples Nos. 13 to 15 used raw egg lecithin. Sample No. 16 had no lecithin and Sample No. 5' is the lecithin of Sample 5 which had been applied with a calendering process.

TABLE 3

| Sample No. | Lecithin (PHP) | Bm (gauss) | Br (gauss) | Increase of Br (%) | Rs (%) | Hc (Oe) | P (%) | ρ (%) |
|---|---|---|---|---|---|---|---|---|
| 1 | 0.5 | 1480 | 1210 | — | 81.0 | 320 | 38.0 | 38.8 |
| 2 | 1.0 | 1650 | 1370 | — | 83.0 | 315 | 37.0 | 38.9 |
| 3 | 1.5 | 1650 | 1370 | — | 83.0 | 315 | 33.0 | 40.9 |
| 4 | 2.0 | 1600 | 1370 | 2.2 | 83.0 | 310 | 32.4 | 40.7 |
| 5 | 2.5 | 1700 | 1420 | — | 83.5 | 310 | 28.5 | 42.5 |
| 6 | 3.0 | 1830 | 1540 | 12.4 | 84.0 | 310 | 27.0 | 42.9 |
| 7 | 4.0 | 1780 | 1480 | 8.8 | 83.3 | 310 | 25.8 | 42.6 |
| 8 | 5.0 | 1910 | 1600 | 18.5 | 84.0 | 310 | 22.9 | 43.1 |
| 9 | 2.0 | 1600 | 1280 | −4.5 | 80.0 | 320 | 36.8 | 38.1 |
| 10 | 3.0 | 1700 | 1390 | 1.5 | 82.1 | 310 | 32.7 | 39.5 |
| 11 | 4.0 | 1640 | 1360 | 0 | 82.9 | 315 | 30.5 | 39.9 |
| 12 | 5.0 | 1630 | 1360 | 0.7 | 83.8 | 310 | 28.0 | 40.3 |
| 13 | 2.0 | 1600 | 1340 | 0 | 83.0 | 310 | 33.4 | 40.1 |
| 14 | 3.0 | 1650 | 1370 | 0 | 83.0 | 310 | 27.7 | 42.4 |
| 15 | 5.0 | 1620 | 1350 | 0 | 83.5 | 310 | 26.2 | 41.3 |
| 16 | 0 | 1420 | 1100 | — | 78.0 | 320 | 45.0 | 34.9 |
| 5' | 5.0 | 1940 | 1640 | — | 84.4 | 305 | 19.6 | 45.0 |

The packing density ρ and the porosity P were obtained from the following equations:

$$\rho(\%) = [(Wc/Sm)(\phi/\rho p)/Va] \times 100$$

$$P(\%) = \{1 - Wc/Sm\{[\phi/\rho p] + (1-\phi)/\rho B\}/Va\} \times 100$$

where $Va = Sm \cdot t$
$Sm$ = area
$t$ = thickness of magnetic coating film
$Wc$ = weight of coating film on area $Sm$
$\phi$ = powder weight per unit coating weight
$\rho p$ = density of magnetic powder = 4.66
$\rho B$ = density of binder and lecithin system (binder density = 1.35, lecithin density = 1.10)

As will be apparent from Table 3, the magnetic recording medium using high purity lecithin has an improved maximum flux density $B_m$, residual magnetic flux density $B_r$, squareness ratio $R_s$ and packing density ρ. In Table 3 there is shown an increased rate of $B_r$ as compared with the use of raw egg lecithin. The porosity P becomes large in the case of raw lecithin. Thus is believed to be resulted from the bubbling effect of cephalin-protein fractions as impurities. In this connection, the measured results of magnetic characteristics obtained are shown in Table 4 with the added amounts of cephalin and protein fractions being changed, and with no lecithin being present.

TABLE 4

| Amount of Cephalin-Protein (PHP) | P (%) | $R_s$ (%) | $H_c$ (Oe) | $B_m$ (gauss) | $B_r$ (gauss) |
|---|---|---|---|---|---|
| 5 | 29.3 | 79.3 | 310 | 1690 | 1340 |
| 3 | 35.4 | 78.7 | 310 | 1550 | 1220 |
| 2 | 35.9 | 78.5 | 310 | 1550 | 1220 |
| 1 | 40.9 | 76.9 | 310 | 1480 | 1140 |

It should be noted from Table 4 that the porosities are large while the values of squareness ratio, maximum magnetic flux density, and residual magnetic flux density are low compared with those in the case of high purity lecithin.

FIG. 8 shows the relation between concentration of dispersant and the residual magnetic flux density wherein curve 1 was obtained with a high purity (91%) lecithin according to this invention, and curves 2 to 4 were of acetone purified lecithin, unpurified lecithin, and the cephalin-protein fraction, respectively.

Table 5 shows the measured results obtained from magnetic recording media of samples 17 to 20 prepared after the excess lecithin had been removed in a solvent according to Example 2.

TABLE 5

| Sample No. | Lecithin (PHP) | Dilution Condition | $B_m$ (gauss) | $B_r$ (gauss) | Increase of $B_r$ (%) | $R_s$ (%) | $H_c$ (Oe) | P (%) | ρ (%) |
|---|---|---|---|---|---|---|---|---|---|
| 17 | 5.0 | 1 | 1716 | 1367 | 18.4 | 79.3 | 303 | 27.7 | 40.5 |
| 18 | 5.0 | 2 | 1652 | 1299 | 12.5 | 78.6 | 305 | 26.5 | 41.1 |
| 19 | 5.0 | 4 | 1771 | 1418 | 22.8 | 80.1 | 307 | 28.4 | 40.1 |
| 20 | 5.0 | 16 | 1703 | 1364 | 18.1 | 80.1 | 307 | 27.6 | 40.5 |

TABLE 5-continued

| Sample No. | Lecithin (PHP) | Dilution Condition | $B_m$ (gauss) | $B_r$ (gauss) | Increase of $B_r$ (%) | $R_s$ (%) | $H_c$ ($O_e$) | P (%) | p (%) |
|---|---|---|---|---|---|---|---|---|---|
| 21 | 0 | — | 1287 | 881 | −23.7 | 68.4 | 325 | 48.6 | 32.6 |
| 22 | 5.0 | 1 | 1591 | 1155 | 0 | 72.6 | 290 | 29.7 | 39.3 |

The dilution condition indicates the dilution multiplying factor, the No. 1 indicating that no dilution was carried out. Sample No. 21 illustrates a case in which no lecithin was added, and Sample No. 22 is the case where raw lecithin was used.

From Table 5 it will be seen that even in magnetic recording media prepared by removing excess lecithin in the solvent, the variation of characteristics does not appear and every sample shows an increase of $B_r$.

It was further ascertained that when excess lecithin in the solvent is removed, the wear resistance is improved as compared to the case where the lecithin is not removed. This was determined by moving a magnetic medium for a given time under wear conditions, and measuring the weight before and after movement to determine the amount of fallen powder. This measurement was carried out with respect to a magnetic tape prepared in the manner of Example 1 with high purity lecithin being added in an amount of 1.1 PHP and with a magnetic tape prepared as in Example 1 without the excess lecithin removing process and the amount of high purity lecithin being 4.5 PHP. As apparent from the results of Table 1, when the added amount is 1.1 PHP, the entire amount of lecithin is adsorbed onto the surface of the magnetic powder while when the added amount is 4.5 PHP, the excess lecithin remains in the solvent and excess lecithin remains in the magnetic tape in a binder. In measuring the relative amounts of fallen powder with respect to the two tapes, if the amount of fallen powder was taken as 1 for the lecithin of 1.1 PHP, then the relative amount for the lecithin of concentration 4.5 PHP is 2.

The gamma $Fe_2O_3$ used in the above examples was an acicular powder having a long axis of from 0.7 to 0.8 microns, and an axis ratio of 8 to 10. It had a saturation magnetization of 72 emu/g and a specific surface area of 21.1 square meters per gram. However, various kinds of magnetic powder can be used such as $Fe_3O_4$, gamma $Fe_2O_3$ or $Fe_3O_4$ containing cobalt or other elements, iron oxides having intermediate oxidized states between gamma $Fe_2O_3$ and $Fe_3O_4$, iron oxide containing an element such as cobalt and having an oxidized state between gamma $Fe_2O_3$ and $Fe_3O_4$, or ferromagnetic powder such as $CrO_2$ (ferromagnetic chromium dioxide) or metals or alloys such as iron, iron-cobalt, iron-cobalt-nickel, or the like. In addition, mixtures of these various materials can be used and these examples are not meant to be limiting.

As the binder agent, there may be used various kinds of well known thermoplastic and thermosetting resins such as vinyl chloride-vinyl acetate copolymers, vinyl chloride-vinylidene chloride copolymers, cellulose derivatives such as nitrocellulose, butadiene-acrylonitrile copolymers, polyester resins, epoxy resins, polyurethane resins, or mixtures thereof. If necessary, the binder may include a curing agent such as a polyisocyanate compound.

The magnetic layer may also include other conventional additives such as lubricants such as silicone oil, graphite, molybdenum disulfide, fatty acid esters, hydrocarbons, or the like. In addition, antistatic agents such as carbon black, quarternary ammonium salts, or the like can also be added. The composition may also include abrasive particles such as alumina or $Cr_2O_3$ or the like.

As the solvent for the composition "A" for dilution or for coating purposes, we can use one or more solvents such as MEK, cyclohexanone, toluene, tetrahydrofuran, isopropyl alcohol, and butyl acetate. The only requirement is the solvent a capability of dissolving lecithin.

Figure 9:
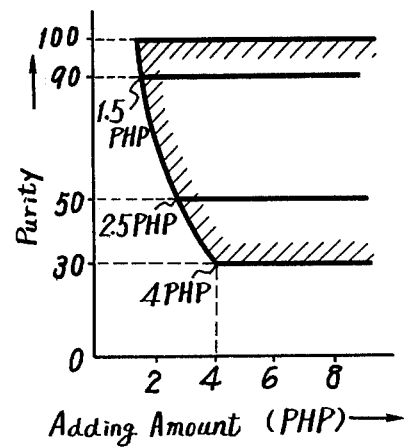
FIG. 9 is a graph showing the relation between the purity of the additive and the amount which should be added to form a monomolecular layer of lecithin.

In the examples, the purity of the high purity lecithin was 91%. However, it is also possible to use a lecithin having a purity of 30% or more and to add sufficient amounts so as to substantially cover the whole surface of the magnetic powder particles with a monomolecular layer which is substantially entirely lecithin because of the selective adsorption. In this connection, FIG. 9 shows the relationship between the degree of purity and the amount to be added, in which the cross hatched area indicates the range in which the monomolecular layer can be effectively formed. From FIG. 9, it will be seen that the monomolecular layer can be formed by using 1.5 PHP where the purity is 90% or more, about 2.5 PHP for a purity of 50%, and 4 PHP or more where the purity is about 30%.

Figure 10:
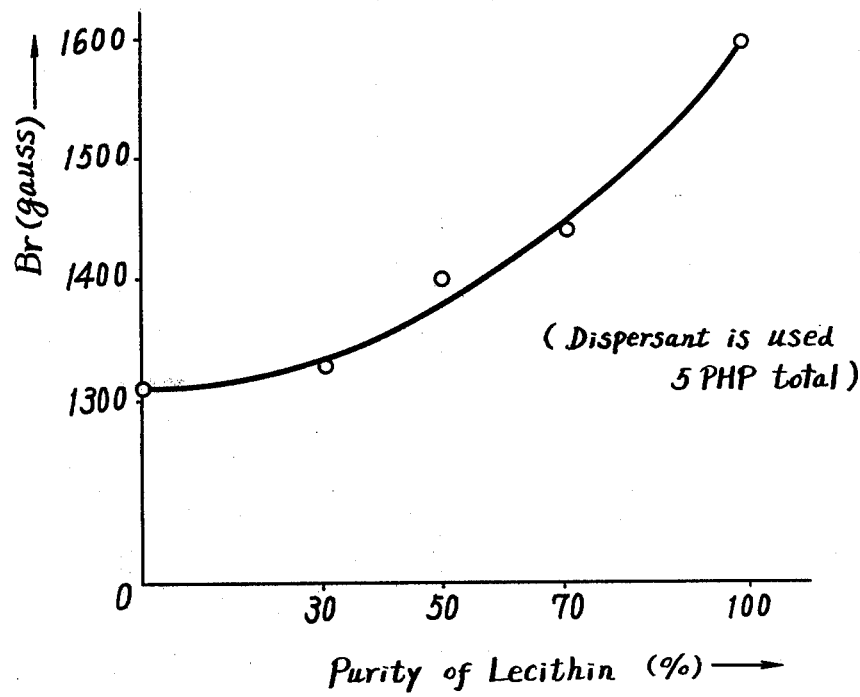
FIG. 10 is a graph showing the relationship between residual magnetic flux density and the purity of lecithin employed.
Figure 11:
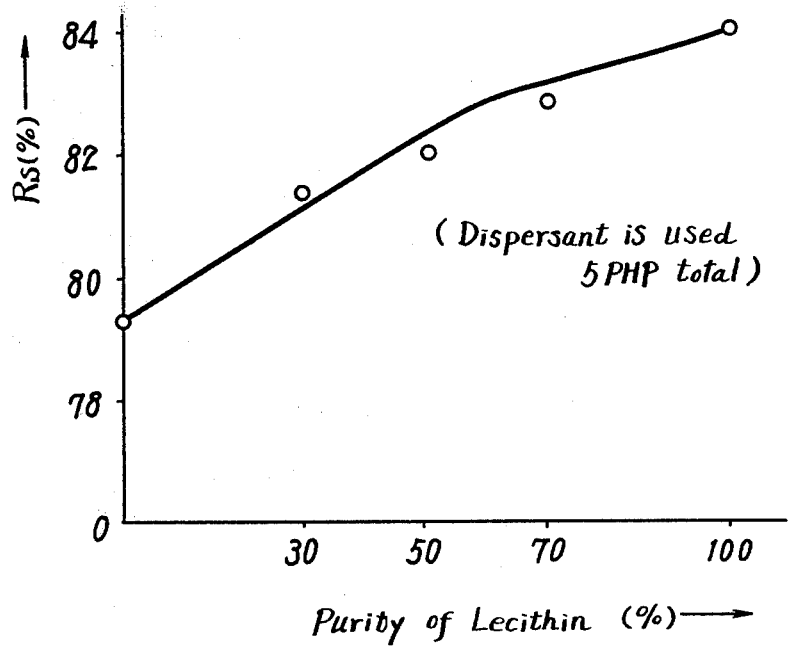
FIG. 11 is a graph showing the relationship between squareness ratio and the purity of the lecithin employed.

The minimum concentration of high purity lecithin should be at least 30% and preferably 50% or more because of the relationship between the purity of lecithin and its Br and Rs, respectively as shown in FIGS. 10 and 11.

As described in the foregoing, the monomolecular layer of lecithin can be surely formed on the surface of the magnetic powder, and consequently the magnetic and mechanical characteristics of the resulting record member can be improved.

It will be evident that a number of changes and variations can be effected without departing from the scope of the novel concepts of the present invention.

We claim as our invention:

1. A magnetic recording medium comprising:
   a non-magnetic base, and
   a magnetic layer coated on said base, said magnetic layer including magnetic powder particles dispersed in a resinous binder, said powder particles being substantially completely coated with a substantially mono-molecular layer of lecithin adsorbed thereon, said lecithin being deposited from a composition having a lecithin concentration of at least 30% and being substantially devoid of fats, free fatty acids, cephalin and proteins.

2. A method of preparing a magnetic recording medium comprising the steps of:
   (a) mixing magnetic powder in an organic solvent with a purified lecithin composition having a purity of at least 30% in an amount sufficient to cover substantially the entire surface of the magnetic powder particles with a monomolecular layer consisting substantially of lecithin, (b) mixing the thus treated magnetic powder with a synthetic resin binder to form a magnetic paint, and
(c) applying said magnetic paint to a non-magnetic base to form a magnetic layer.

3. The method of claim 2 in which the lecithin composition has a purity of at least 50%.

4. The method of claim 2 in which the purified lecithin composition is purified by the decomposition of a lecithin-cadmium chloride complex salt which is a reaction product of an acetone and ethanol extracted lecithin derived from soybean or eggs.

5. The method of claim 2 in which the amount of purified lecithin composition is from 0.5 to 5 parts per hundred parts by weight of magnetic particles.

6. The method of claim 2 in which the amount of purified lecithin composition is in the cross-hatched portion of the diagram of FIG. 9 of the drawings.

7. A method of preparing a magnetic recording medium comprising the steps of:
(a) mixing magnetic powder in an organic solvent with a purified lecithin composition having a purity of at least 30 percent in an amount sufficient to cover substantially the entire surface of the magnetic powder particles with a monomolecular layer consisting substantially of lecithin,
(b) removing the non-adsorbed lecithin from said organic solvent,
(c) mixing the thus treated magnetic powder with a synthetic resin binder to form a magnetic paint, and
(d) applying said magnetic paint to a non-magnetic base to form a magnetic layer.

8. The method of claim 7 in which the lecithin composition has a purity of at least 50%.

* * * * *